United States Patent
Timmings

(10) Patent No.: US 6,352,277 B1
(45) Date of Patent: Mar. 5, 2002

(54) FIFTH WHEEL COUPLER

(75) Inventor: Neil Timmings, Wigan (GB)

(73) Assignee: Fontaine International Europe Ltd, Lancashire (GB)

( * ) Notice: Subject to any disclaimer, the term of this patent is extended or adjusted under 35 U.S.C. 154(b) by 0 days.

(21) Appl. No.: 09/554,607

(22) PCT Filed: Sep. 29, 1999

(86) PCT No.: PCT/GB99/03231

§ 371 Date: Jun. 1, 2000

§ 102(e) Date: Jun. 1, 2000

(87) PCT Pub. No.: WO00/20270

PCT Pub. Date: Apr. 13, 2000

(30) Foreign Application Priority Data

Oct. 2, 1998 (GB) ............................................ 9821363

(51) Int. Cl.[7] ............................................... B62D 53/08
(52) U.S. Cl. ...................................................... 280/437
(58) Field of Search ................................ 280/433, 434, 280/437, 438.1, 441.1

(56) References Cited

U.S. PATENT DOCUMENTS 2,426,002 A    8/1947   Den Besten et al.
3,194,585 A    7/1965   Cochrane
4,566,715 A  * 1/1986   Buckley

FOREIGN PATENT DOCUMENTS

GB    1377741    12/1974
GB    2236729    4/1991

* cited by examiner

*Primary Examiner*—Kevin Hurley
(74) *Attorney, Agent, or Firm*—Dennison, Scheiner & Schultz

(57) ABSTRACT

A vehicle coupling device is disclosed that includes a coupling plate provided with a slot for reception of a waisted portion of a king-pin of a trailer, a pivotally mounted coupler jaw for holding the king-pin in the slot and a locking bar for locking the coupler jaw in its closed position. The coupler jaw includes a sensor arm extending in a different (lower) plane to a hook. The arm, in use, is contacted by a lower flange of a correctly aligned king-pin, and causes the jaw to pivot so that the hook engages the waist of the king-pin. By this dual alignment of hook and arm, there is achieved a failsafe means of preventing a king-pin, which enters the slot at the wrong height, from causing actuation of the jaw and the lock bar.

7 Claims, 4 Drawing Sheets

FIFTH WHEEL COUPLER

TECHNICAL FIELD OF THE INVENTION

This invention relates to a fifth wheel coupling for mounting on a towing vehicle for co-operation with a waisted king-pin mounted on a trailer.

BACKGROUND ART

A known form of fifth wheel coupling is shown in GB 1377741 wherein a pivotally mounted combined hook and sensor arm and a locking member are both mounted on the same side of a slot in a plate arranged to receive a king-pin of a trailer.

The king-pin has an enlarged portion and a waisted portion and when correctly aligned the king-pin engages the sensor arm as the king-pin is advanced into the slot in the plate and the hook moves from an open position to a closed position in which the hook engages the waisted portion of the king-pin.

The aforesaid coupling also includes a pivotally mounted locking member which is moveable from a withdrawn position in which the combined hook and sensor arm are held in the open position to a closed position which retains the hook in the closed position. In moving from the withdrawn position to the closed position the locking member rotates and is axially slidable.

Another known form of fifth wheel coupling is disclosed in GB2236729 wherein a pivotally mounted hook and an axially slidable locking member are mounted on opposite sides of the slot in the mounting plate which is designed for reception of the king-pin of the trailer. The limbs of the hook engage around the waisted portion of the king-pin as it enters the slot. One limb of the hook is formed with a recess through which the enlarged lower portion of the king pin will pass if the king pin is incorrectly aligned and too high for accurate engagement by the hook.

SUMMARY OF THE INVENTION

The present invention proposes an improved arrangement of fifth wheel coupling for mounting on a towing vehicle for co-operation with a waisted king-pin mounted on a trailer, the coupling including a pivotally mounted member comprising a hook and a sensor arm and an axially moveable locking member, the pivotally mounted member and the locking member being arranged on opposite sides of a slot in a plate on which the pivotally mounted member is mounted and the hook being moveable between an open position and a closed position in which the hook can co-operate with the waist of a king-pin to retain the king-pin in the slot, characterised in that the hook and the sensor arm are rigid one with another and are offset from each other so as to extend in different planes so that the sensor arm, when the hook is in the open position, is arranged to be engaged by the enlarged portion of a correctly aligned king-pin entering the slot, whereupon the hook is moved towards its closed position.

The hook can be biased from its closed position to its open position, the open position being such that a king-pin can move freely out of the slot.

The locking member can be moveable between a withdrawn position clear of the slot and a locking position in which the hook is maintained in its closed position.

The free end of the sensor arm can be in contact with a cam surface on the locking member when the hook is in the open position.

The locking member can be mounted on a biased linkage mechanism, the linkage mechanism including a first detent which is engaged when the sensor arm is released from the locking member thereby preventing movement of the locking member.

The linkage mechanism can also include a second detent which can be manually engaged to draw the locking member across the slot thereby allowing the king-pin to move relative to the slot and rotate the pivotally mounted member.

The king-pin can be arranged to contact the locking member as it moves relative to the slot thereby causing the locking mechanism to become disengaged from the second detent.

The locking member can be biased towards its locking position.

The locking member can be moveable from left to right from its withdrawn position to its closed position and the pivotally mounted member is rotatable in a clockwise direction from its open position to its closed position.

The invention can further comprise a towing vehicle fitted with a fifth wheel coupler as defined above and a trailer having a waisted king-pin, the trailer being coupled to the towing vehicle by co-operation of the hook of the coupling with the waist of the king-pin.

BRIEF DESCRIPTION OF THE DRAWINGS

The present invention will now be more particularly described with reference to the accompanying drawings in which.

DETAILED DESCRIPTION OF THE PREFERRED EMBODIMENT

Figure 1:
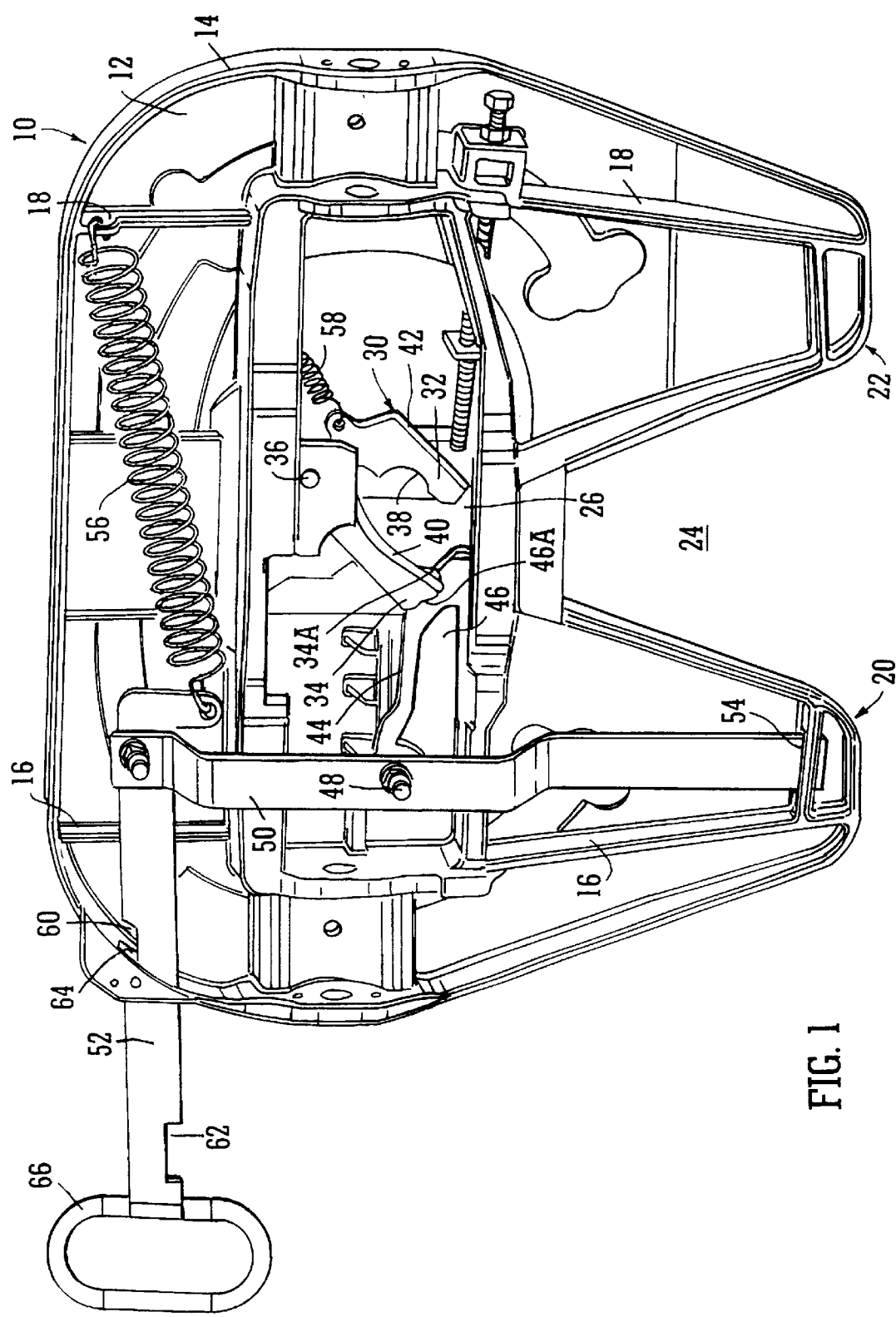
FIG. 1 is a bottom plan view of one form of fifth wheel coupling according to the present invention with the coupling arranged to receive a waisted king-pin of a trailer.
Figure 2:
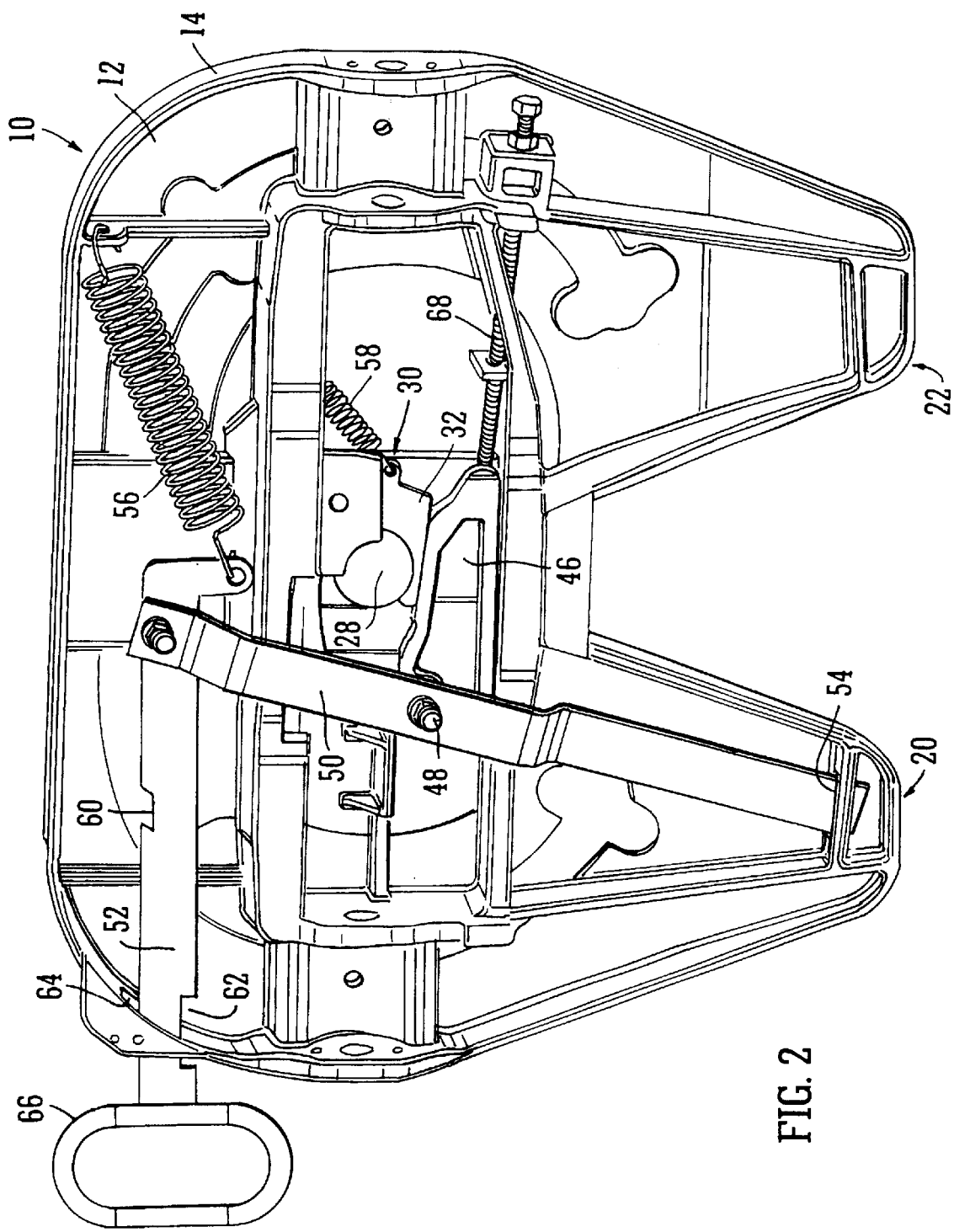
FIG. 2 shows the fifth wheel coupling as in FIG. 1 but with a waisted king-pin held in position by a hook and a locking member maintaining the hook in the closed position.
Figure 3:
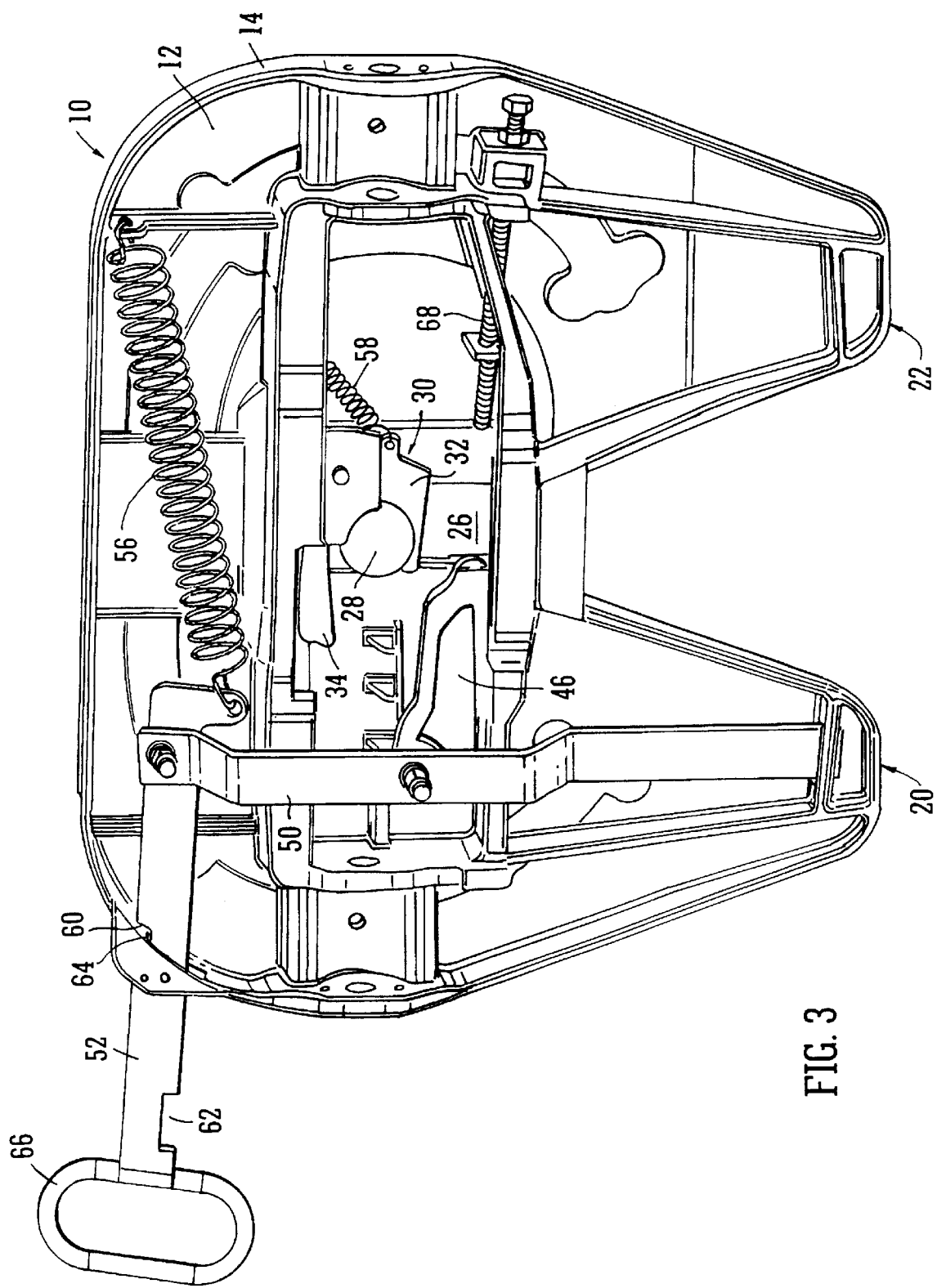
FIG. 3 shows the coupling of FIGS. 1 and 2 with a locking member of the coupling retracted prior to disengagement of the king-pin from the coupling.

Referring to FIGS. 1 to 3 of the drawings, there is shown a fifth wheel coupling (10) comprising a top plate (12) having a peripheral flange (14) and strengthening webs (16, 18).

The top plate (12) has two rearwardly diverging leg portions (20, 22), the inner edges of which define an opening (24) for guiding into a longitudinally elongate slot (26), a king-pin (28) of a trailer (not shown) which is to be attached to the towing vehicle (not shown) on which the coupling (10) is mounted.

Figure 4:
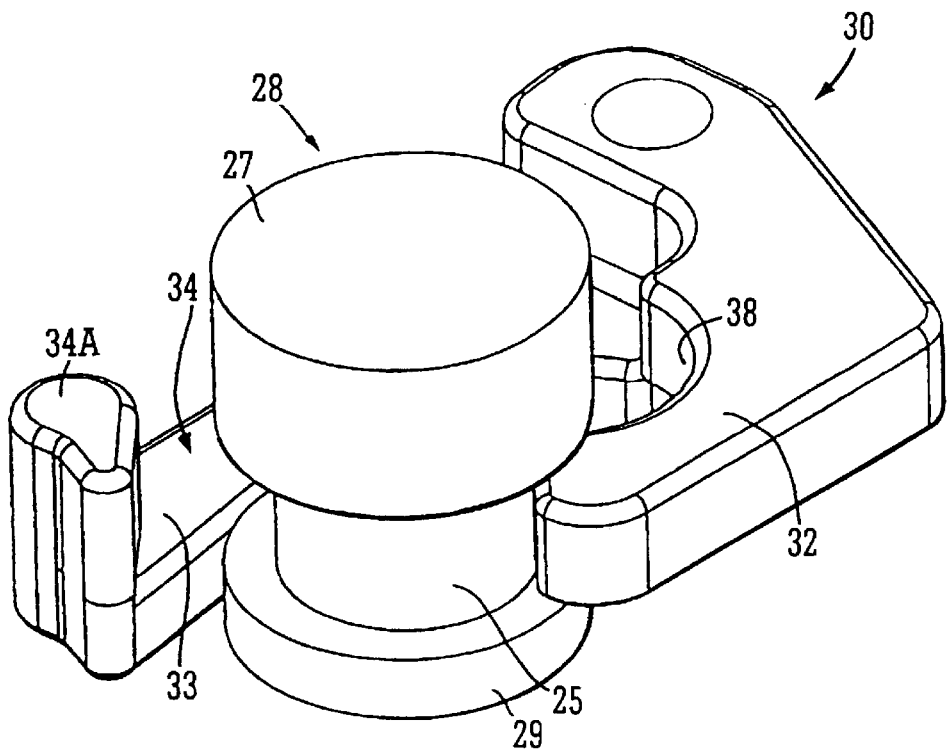
FIG. 4 is an enlarged perspective view, from above, of the unitary sensor arm and hook in the coupling of FIGS. 1 to 3, showing its engagement by a correctly aligned king-pin.
Figure 5:
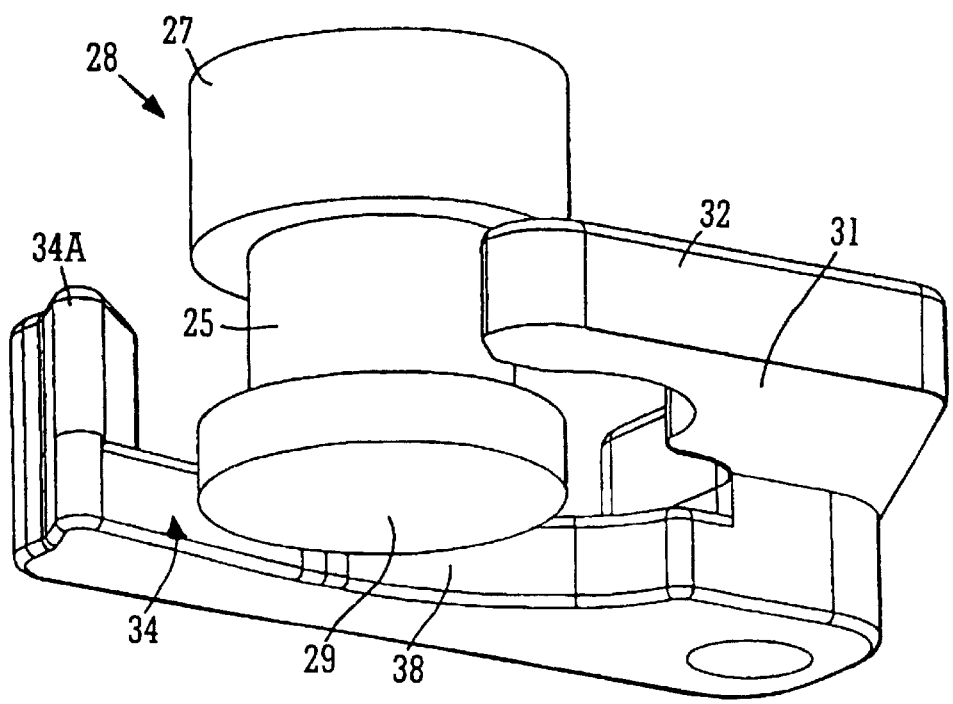
FIG. 5 is perspective from below of the same arrangement as in FIG. 4.

The king-pin (28) is of a type conforming to international standards and has a waisted part (25) situated between upper and lower enlarged flanges (27, 29) (see FIGS. 4 and 5).

A coupler jaw (30) is provided for retaining the king-pin (28) in the slot (26) when the vehicle and trailer are connected together.

As best shown in FIGS. 4 and 5 the coupler jaw (30) is fabricated in one piece to include a hook (32) and a sensor arm (34). The hook and the arm are offset from each other so as to extend in different planes, the arm extending in a plane below that of the hook. As shown, a lower face (31) of the hook (32) lies in a plane which is spaced a short distance above an upper face (33) of the sensor arm (34). In other modified versions of jaw (30) the lower face (31) of the hook (32) may be substantially co-planar with the upper face (33) of the arm (34).

The coupler jaw (30) is pivotally mounted on the plate (12) by means of a mounting pin (36).

The hook (32) has an arcuate surface (38) having a radius conforming to that of the waisted portion (25) of the king-pin (28) and the sensor arm (34) has a reaction surface (40) which has, in part, a radius greater than the radius of the lower flange (29) of the king-pin (28). The parallel but offset disposition of the arm (34) and the hook (32) provide a failsafe means of preventing a king-pin (28) which enters the slot (24) at too high a level from causing actuation of the jaw (30) and the lock bar (46).

The hook (32) has a locking surface (42) intended to be engaged by a surface (44) on a locking member (46).

The hook (32) is retained around the king-pin (28) which has entered the slot (26) by means of the locking member (46).

The locking member (46) is pivotally mounted at (48) but is arranged to move only transversely of the slot (26) between a position withdrawn clear of the slot (26) (see FIG. 1) and a locked position (FIG. 2) in which the locking member (46) retains the hook (32) around the king-pin (28).

The locking member (46) is pivotally mounted to a link (50) of a linkage mechanism which also includes a throw bar (52) which is pivotally mounted at one end of the link (50), the other end of which is loosely mounted in a slot provided in a web (54) which extends between the web (16) and the peripheral flange (14).

The throw bar (52) is biased by a tension spring (56) which is attached between the throw bar and the web (18).

Similarly, the coupler jaw (30) is biased by a spring (58) which is attached between the coupler jaw and the plate (12).

The throw bar is provided with two detents (60, 62) which co-operate with, as will be described below, opposite sides of a slot (64) formed in the peripheral wall (14).

The sensor arm (34) has an enlarged end or upward projections (34A) which engages with a co-operating surface (46A) on the locking member (46) as shown in FIG. 1. In the arrangement as shown in FIG. 1 it will be appreciated that the spring (56) is tending to move the locking member (46) so that it moves transversely across the slot (26) but the engagement of the sensor arm (34) with the locking member (46) prevents transverse movement of the locking member (46).

The arrangement of the coupler jaw (30) as shown in FIG. 1 is such that the fifth wheel coupling can receive a king-pin of a trailer.

As the king-pin (28) of the trailer enters the slot (26) the lower enlarged portion (29) of the king-pin (28) contacts the sensor arm (34) and rotates the coupler jaw (30) about the pivot (36), tensions the spring (58), disengages the sensor arm (34) from the locking member (46) and the hook (32) engages the waisted portion of the king-pin (28).

As the sensor arm (34) is now disengaged from the locking member (46) the tension in the spring (56) can now move the link (50) and the throw arm (52) thereby moving the locking member (46) across the slot (26) so that the surface (44) of the locking member (46) engages with the surface (42) of the hook (32) as shown in FIG. 2, thereby locking the hook in position and preventing the king-pin (28) from becoming disengaged from the coupling jaw (30).

As will be seen from FIG. 2, an adjustable stop (68) is provided to limit the transverse movement of the locking member (46).

In the arrangement shown in FIG. 2 the detent (62) engages the throw arm (52) in the slot (64) in the rim (14).

Referring to FIG. 3, in order to allow the king-pin (28) to be withdrawn from the slot (26) the throw arm (52) is manually disengaged from the detent (62) using the handle (66) and pulled outwardly, thereby tensioning the spring (56). The arm (52) is held in position by the detent (60) so that the locking member (46) is thus withdrawn from its position extending transversely of the slot (26) as shown in FIG. 2 to the position shown in FIG. 3. The king-pin (28) is still retained in position by the relative position of the tractor and trailer combination. The vehicle to which the fifth wheel coupling (10) is attached can then be moved forwardly of a stationary trailer and the king-pin (28) on the trailer engages the coupler jaw (30) to rotate it about the pivot (36) and also engages with and axially moves the locking member (46) further across the slot (26). The axial movement of the locking bar (46) causes the lever (50) to rotate about its pivot (54) in turn moving the arm (52) outwardly. The tension spring (56) then acts to rotate the arm (52) about its pivot on the lever (50) to release it from the slot (64). As the king-pin (28) leaves the slot (26) the jaw (34) rotates further and the jaw cam (34A) engages the surface (46A) of the locking member (46) to prevent the locking bar from closing. The locking bar is thus re-set as shown in FIG. 1, and the coupler is ready for coupling, the arm (52) and thus the locking member (46) being free to move automatically when the coupler closes.

If, on attempting to engage a towing vehicle with a trailer, the king-pin (28) is not positioned in the correct plane, the lower flange (29) of the king-pin (28) may pass over the sensor arm (34) and make contact with a stop plate in which case the hook (32) will not close. Alternatively, if the lower flange (29) is positioned only slightly too high it will move the sensor arm (34) but will be in a position such that the hook (32) will attempt to engage the lower flange (29) which is too large to fit between the arcuate surface (38) on the hook (32) and the stop plate, thus the hook (32) will be prevented from moving into its closed position.

The benefit of having the coupling jaw (30) and the locking bar (46) mounted on opposite sides of the slot (26) and thus moving in the same orientation is a reduction in the movement of the locking bar (46). As will be appreciated the security of the locking mechanism comes from the spring (56) which holds the locking bar (46) in position when the coupling jaw (30) is closed (see FIG. 3). As the locking bar (46) is retracted the tension increases, and the more the locking bar has to be withdrawn the greater will be the final load for the operator to cock the locking mechanism by operation of the throw bar (52). Therefore, the shorter stroke mechanism as described above reduces the operating effort.

What is claimed is:

1. A fifth wheel coupling for mounting on a towing vehicle for co-operation with a waisted king-pin mounted on a trailer, said coupling comprising a plate and a slot in said plate defined by a closed end and opposing sides, a member pivotally mounted on said plate at one side of said slot, said member having a top and a bottom and comprising a hook having a bottom side laying in a first plane and a sensor arm having a top laying in a second plane at or below said bottom plane which are rigid one with another, said hook being moveable between an open position allowing access to said slot and a closed position in which it extends across said slot and can co-operate with the waist of a king-pin to retain the king-pin in said slot, and said sensor arm, when said hook is in its open position being arranged to be engaged by an enlarged portion of a correctly aligned king-pin entering said slot, whereupon said hook is moved towards its closed position, and an axially moveable locking member arranged at an opposite side of said slot to said pivotally mounted member, said locking member having a cam surface, with which a free end of said sensor arm makes contact when said hook is in its open position.

2. A coupling as claimed in claim 1 in which the hook is biased from its closed position to its open position, the open position being such that a king-pin can move freely out of the slot.

3. A coupling as claimed in claim 1 in which the locking member is mounted on a biased linkage mechanism, the linkage mechanism including a first detent which is engaged when the sensor arm is released from the locking member thereby preventing movement of the locking member.

4. A coupling as claimed in claim 3 in which the linkage mechanism includes a second detent which can be manually engaged to draw the locking member across the slot allowing the king-pin to move relative to the slot thereby rotating the pivotally mounted member.

5. A coupling as claimed in claim 4 in which the kingpin can contact the locking member as it moves relative to the slot thereby causing the locking mechanism to become disengaged from the second detent.

6. A coupling as claimed in claim 1 in which the locking member is biased towards its locking position.

7. A coupling as claimed in claim 1 in which the locking member is moveable from left to right from its withdrawn position to its closed position and the pivotally mounted member is rotatable in a clockwise direction from its open position to its closed position.

* * * * *